US006979268B2

(12) United States Patent
Peters et al.

(10) Patent No.: US 6,979,268 B2
(45) Date of Patent: Dec. 27, 2005

(54) JAW CLUTCH SHOCK FORCE DAMPER SYSTEM

(75) Inventors: Jeremy D. Peters, New Holland, PA (US); Michael J. Digman, Denver, PA (US)

(73) Assignee: CNH America LLC, Racine, WI (US)

( * ) Notice: Subject to any disclaimer, the term of this patent is extended or adjusted under 35 U.S.C. 154(b) by 9 days.

(21) Appl. No.: 10/722,744

(22) Filed: Nov. 25, 2003

(65) Prior Publication Data

US 2005/0113175 A1 May 26, 2005

(51) Int. Cl.[7] .............................................. F16D 7/04
(52) U.S. Cl. ..................... 464/39; 192/56.61
(58) Field of Search ........................ 464/38, 39; 474/70, 474/903; 56/DIG. 6, DIG. 15; 267/161; 192/56.61, 56 R, 69.81, 107 C

(56) References Cited

U.S. PATENT DOCUMENTS

| 2,291,407 A | * | 7/1942 | Talbert ......................... 464/39 |
| 2,348,717 A | | 5/1944 | Banker |
| 2,869,697 A | | 1/1959 | Marshall |
| 2,869,700 A | | 1/1959 | Bowden |
| 3,314,257 A | | 4/1967 | Fosler et al. |
| 3,491,602 A | | 1/1970 | New |
| 3,934,688 A | | 1/1976 | Sides et al. |
| 4,062,203 A | * | 12/1977 | Leonard et al. ............... 464/38 |
| 4,155,228 A | | 5/1979 | Burgener, Jr. et al. |
| 4,474,275 A | | 10/1984 | Staedeli |
| 5,074,703 A | * | 12/1991 | Dawson ................... 464/39 X |
| 6,128,574 A | | 10/2000 | Dickhans |
| 6,241,067 B1 | | 6/2001 | Höck |

FOREIGN PATENT DOCUMENTS

| DE | 1 945 002 | * | 3/1971 | ............... 192/56 R |

OTHER PUBLICATIONS

SAE Universal Joint and Driveshaft Design Manual, AE-7, Society of Automotive Engineers, Inc., p. 304, TJ1079.S62 1979.*

* cited by examiner

Primary Examiner—Greg Binda
(74) Attorney, Agent, or Firm—Rebecca Henkel

(57) ABSTRACT

The jaw clutch damper system includes a damper which can be a disk spring which absorbs shock forces generated by rapid re-engagement of clutch plates of the clutch and dissipates energy of the shock forces in cooperation with the other components of the clutch, including a clutch spring, such that resulting shock forces exerted against rotatable members connected to the clutch are damped and reduced substantially in magnitude within a time interval before occurrence of a subsequent shock force.

21 Claims, 6 Drawing Sheets

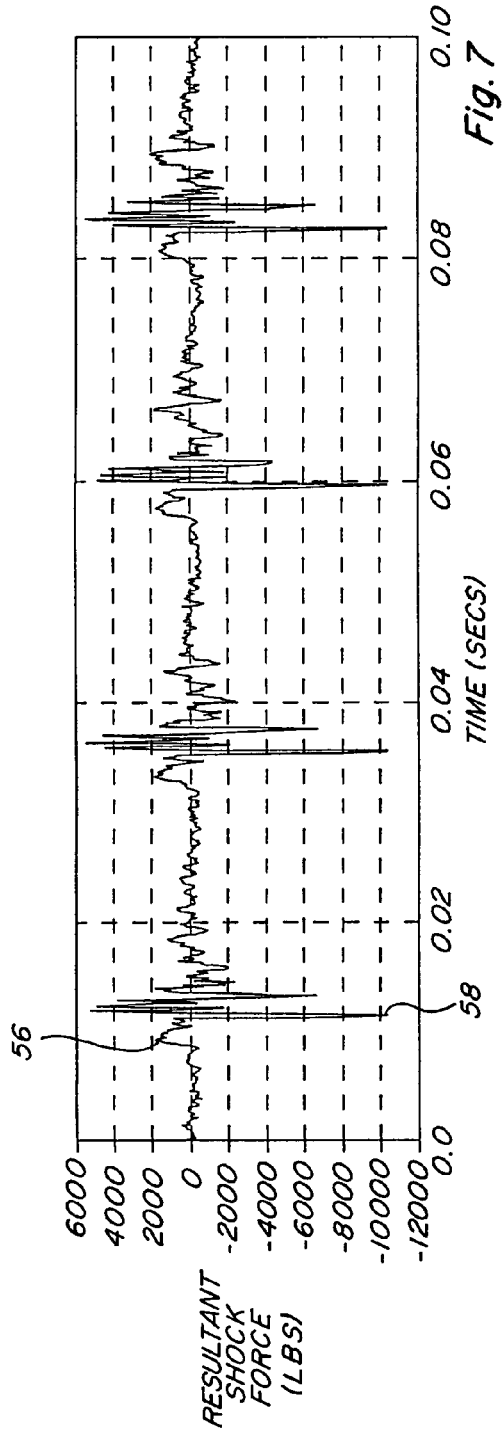
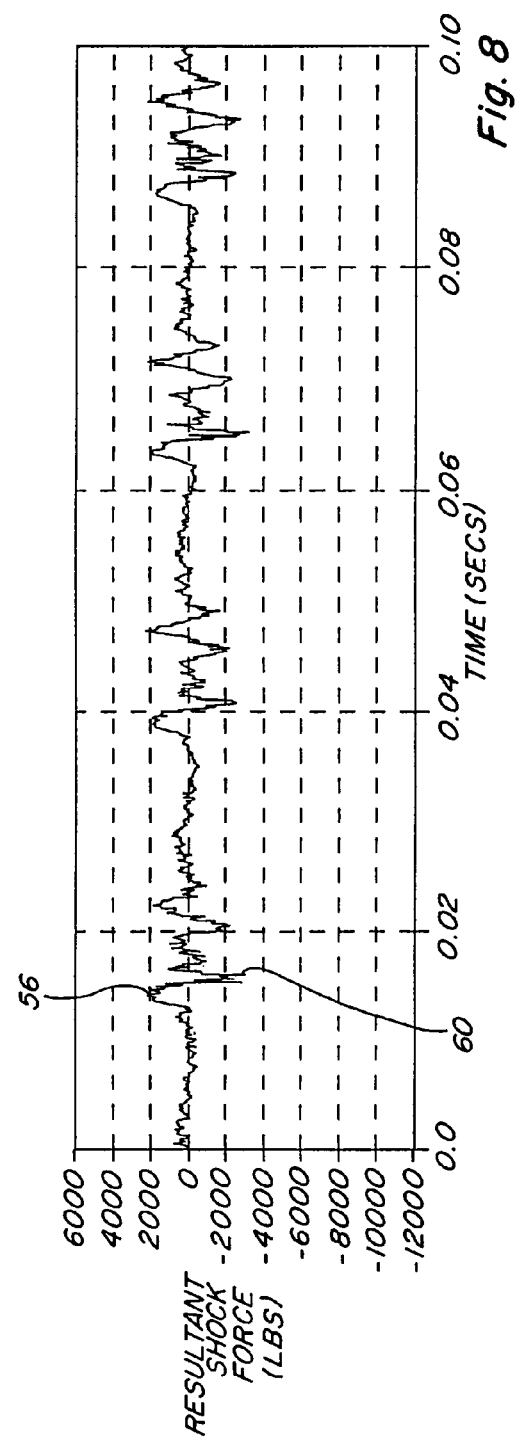

JAW CLUTCH SHOCK FORCE DAMPER SYSTEM

TECHNICAL FIELD

This invention relates generally to a jaw clutch engageable for connecting rotatable members for joint rotation and disengageable for allowing relative rotation of the members, and more particularly, to a jaw clutch including a shock force damper for absorbing shock forces resulting from engagement of the clutch and dissipating the forces over time in cooperation with other components of the clutch for damping or reducing the intensity and magnitude of resultant forces exerted against the rotating members.

BACKGROUND

It is well known to use jaw clutches including clutch plates having opposing matingly engageable or interlocking teeth for connecting rotatable members such as a shaft and a sprocket or pulley for rotation of one by the other. Many such jaw clutches include at least one clutch spring for exerting a spring force against the clutch plates for holding the opposing teeth in engagement. The opposing teeth of such clutches typically include opposing mating ramp surfaces which are slidable one relative to the other by the exertion of a disengagement force therebetween in opposition to and greater than the spring force, to cause the clutch plates to move away from one another. Such disengagement force can result, for example, from high torque conditions generated as a result of resistance to rotation of a driven one of the rotatable members. If the disengagement force is great enough in magnitude and duration to move the clutch plates out of mating engagement, the teeth of the driving clutch plate can ratchet or move over the teeth of the other clutch plate to allow rotation of the driving clutch plate relative to the other clutch plate. As this ratcheting occurs, there are times when the teeth of the two clutch plates are directly opposing so as to hold the clutch plates apart such that the clutch spring stores a substantial amount of potential energy. Then, as the teeth of the driven clutch plate pass the teeth of the other clutch plate and thus are no longer opposing, the clutch plates are no longer held apart such that the stored potential energy will be partially or fully released to drive the clutch plates together. If this occurs abruptly or suddenly, such as due to fast rotation of the driving clutch plate and/or abrupt stoppage or slow down of driven components, the clutch plates can be rapidly driven together so as to exert a shock force therebetween which can have a magnitude several times that of the spring force and the disengagement force. If the ratcheting continues, the shock force can be exerted numerous times or cyclically so as to have a repeating, hammering effect. The shock force can be transmitted through the clutch components to the rotatable members and other components such as supporting bearings, bushings, drive chains, belts, and the like, and can be damaging thereto. Problems that have resulted include movements of the rotatable members and associated components that result in accelerated wear and breakage. The hammering effect can also loosen connected items such as hardware and the like. Such clutches are often used to transmit relatively large amounts of rotational power, for instance, for rotating feeder apparatus within the feeder house of an agricultural combine, and thus, the spring force and disengagement force can have a magnitude of 1000 pounds or more. The magnitude of resultant shock forces exerted against the clutch plates and associated structure including shafts and the like can be many times that, including up to 10,000 pounds.

Accordingly, what is sought is a shock force damping capability for a jaw clutch which overcomes one or more of the problems set forth above.

SUMMARY

What is disclosed is a jaw clutch including a shock damper system or arrangement that overcomes one or more of the problems set forth above. The jaw clutch is conventionally operable for transferring rotational power from a driving rotatable member to a driven rotatable member, and includes a first clutch plate connected to one of the rotatable members for rotation therewith and movement along a predetermined path relative thereto, and a second clutch plate connected to another of the rotatable members for rotation therewith adjacent to an end of the path. The clutch plates include teeth engageable in mating relation when the clutch plates are in abutment for connecting the clutch plates for joint rotation. The clutch includes a clutch spring disposed for exerting a spring force against the first clutch plate for holding it at the end of the path in abutment with the second clutch plate, the clutch spring being yieldable to opposing disengagement forces greater than the spring force applied thereagainst through the first clutch plate so as to allow the first clutch plate to move along the path away from the second clutch plate to disengage the opposing teeth from the mating relationship and allow relative rotation or ratcheting of the clutch plates and the storing and releasing of potential energy by the clutch spring. If this occurs suddenly or abruptly, as discussed above the opposing teeth can rapidly re-engage resulting in exertion of a high shock force between the clutch plates. If this occurs repeatedly, the result can be the potentially damaging hammering effect discussed above. The shock damper of the invention is disposed in connection with the second clutch plate for damping the resultant shock forces transferred to the rotatable members by absorbing at least a substantial portion of the energy of the shock forces as they occur, and releasing and dissipating the energy there over a period of time in cooperation with the clutch components, preferably largely by movements of the clutch spring and the first clutch plate while holding the second clutch plate substantially stationary relative to the end of the path. As a result, the magnitude of shock force transferred to the rotatable members is damped or reduced, and time period of the dissipation corresponds to or is less than the interval or cycle time between sequential ratcheting movements of the teeth, to thereby reduce the occurrence and magnitude of the problems set forth above.

According to a preferred aspect of the invention, the shock damper includes a disk spring which has a sufficiently high spring rate so as to remain substantially rigid when the spring force and disengagement force are exerted thereagainst, but which is resiliently deformable from an initial shape to a deformed shape by the much higher magnitude of the impact created shock force, so as to absorb much of the energy of the shock force, and then return to the initial shape by releasing the energy. Also preferably, the disk spring is operable in cooperation with at least the clutch spring as a system for cyclically transferring at least a portion of the energy of the shock force between the clutch plates for dissipating the energy, such that the resultant shock forces transferred to the rotating members will be substantially damped or lessened in magnitude, preferably by at least half. To achieve the desired damping effect while holding the second clutch plate substantially stationary adjacent to the end of the path, the disk spring preferably has a spring rate several times greater than a spring rate of the clutch spring. As a result, for a disengagement force of a particular magnitude, displacement of the clutch spring and the first clutch plate along the path will be a correspondingly number of times greater than displacement of the disk spring and second clutch plate, if any. And, since the spring rate of the disk spring is several times that of the clutch spring, even when a shock force several times greater than the disengagement force is exerted between the clutch plates, displacement of the disk spring and the second clutch plate is minimized.

As another preferred aspect of the present invention, the first clutch plate is mounted on a rotatable member which is a shaft, for rotation therewith and axial movement relative thereto. The second clutch plate is mounted for rotation on the shaft with the other rotatable member. The other rotatable member can be a second shaft, or a sprocket partially encircled by a chain, or a pulley partially encircled by a belt. The disk spring is preferably disposed between the second clutch plate and an axially fixed member on the shaft. As a result of the high spring rate, the damper will hold the second clutch plate substantially stationary with respect to an axial path of movement of the first clutch plate. Here, it should be noted that it is contemplated that under anticipated shock force levels, some very limited axial movement of the second clutch plate and the rotatable member connected thereto is anticipated and permissible, as long as such movement is within tolerance levels for side play of the chain or belt used, or otherwise will not negatively affect operation thereof.

According to a preferred aspect of the invention, the spring rate of the disk spring is at least ten times greater than the spring rate of the clutch spring. More preferably, the spring rate of the disk spring is at least fifteen times greater than the spring rate of the clutch spring. As examples, for a jaw clutch used for transferring rotatable power from a chain drive to a drive system within a feeder house of an agricultural combine, a range of suitable values for the spring rate of the disk spring can be between about 30,000 and about 40,000 pounds per inch and the spring rate of the clutch spring between about 2,000 and about 3,000 pounds per inch. More specifically, a satisfactory spring rate of the disk spring is about 36,800 pounds per inch and the spring rate for the clutch spring about 2,235 pounds per inch. Of course, other spring rates may be more suitable for other applications, it being most important to recognize that the spring rate for the shock damper should be sufficiently greater than that of the clutch spring such that shock forces will be damped and dissipated with only limited or controlled movement of the second clutch plate and related rotating member, such that that clutch plate and rotating member essentially or substantially remain axially stationary.

BRIEF DESCRIPTION OF THE DRAWINGS

FIG. 7 is a graphical representation of axial shock force over time for the clutch of FIG. 1 without the shock damper of the invention;

FIG. 8 is a graphical representation of axial shock force over time for the clutch of FIG. 1 with the shock damper of the invention;

DETAILED DESCRIPTION OF THE PREFERRED EMBODIMENTS

Figure 1:
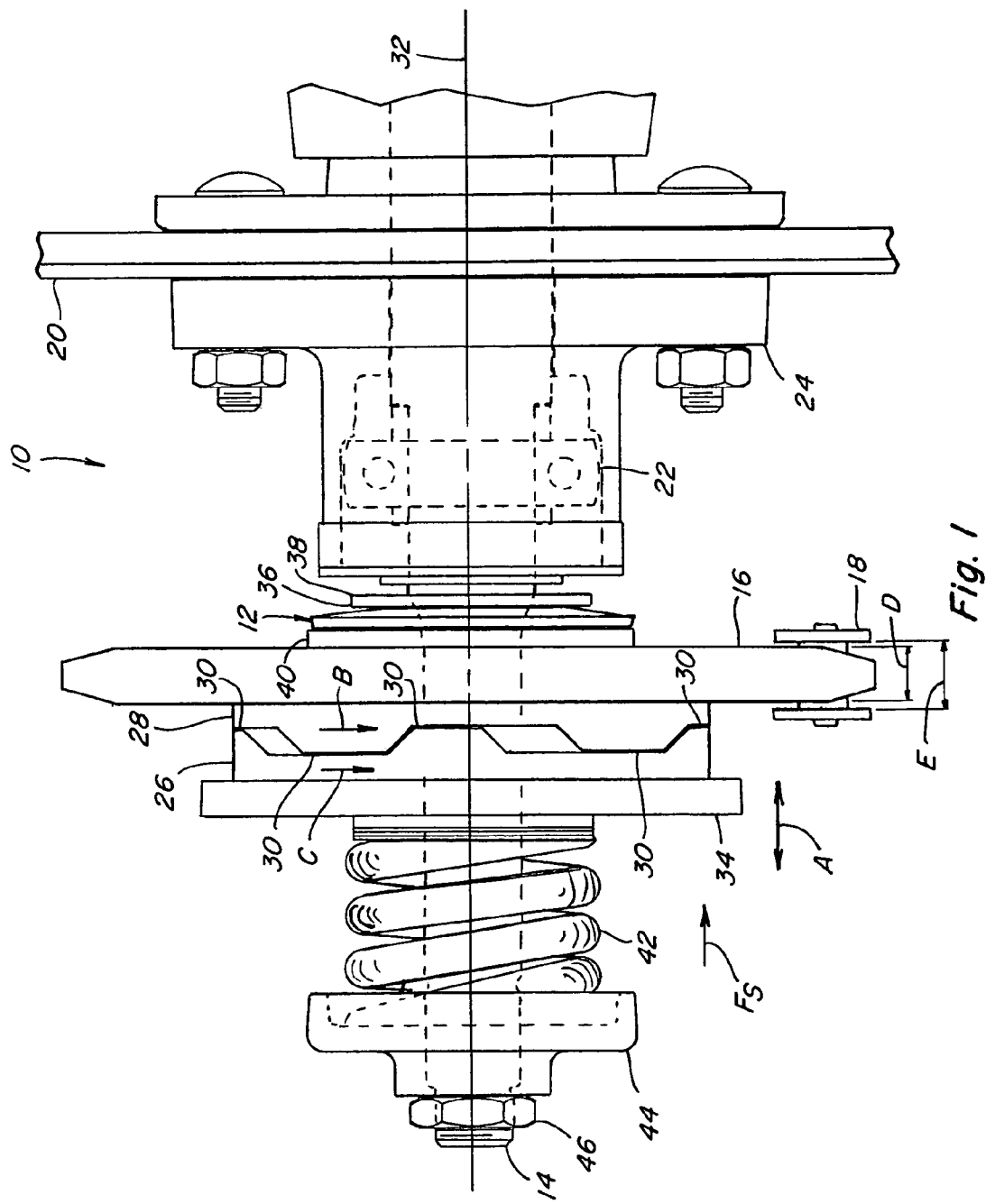
FIG. 1 is a fragmentary side view of a jaw clutch according to the present invention, shown mounted on a rotatable shaft and including a sprocket for rotatable engagement with a chain, a representative link of which is illustrated.
Figure 1A:
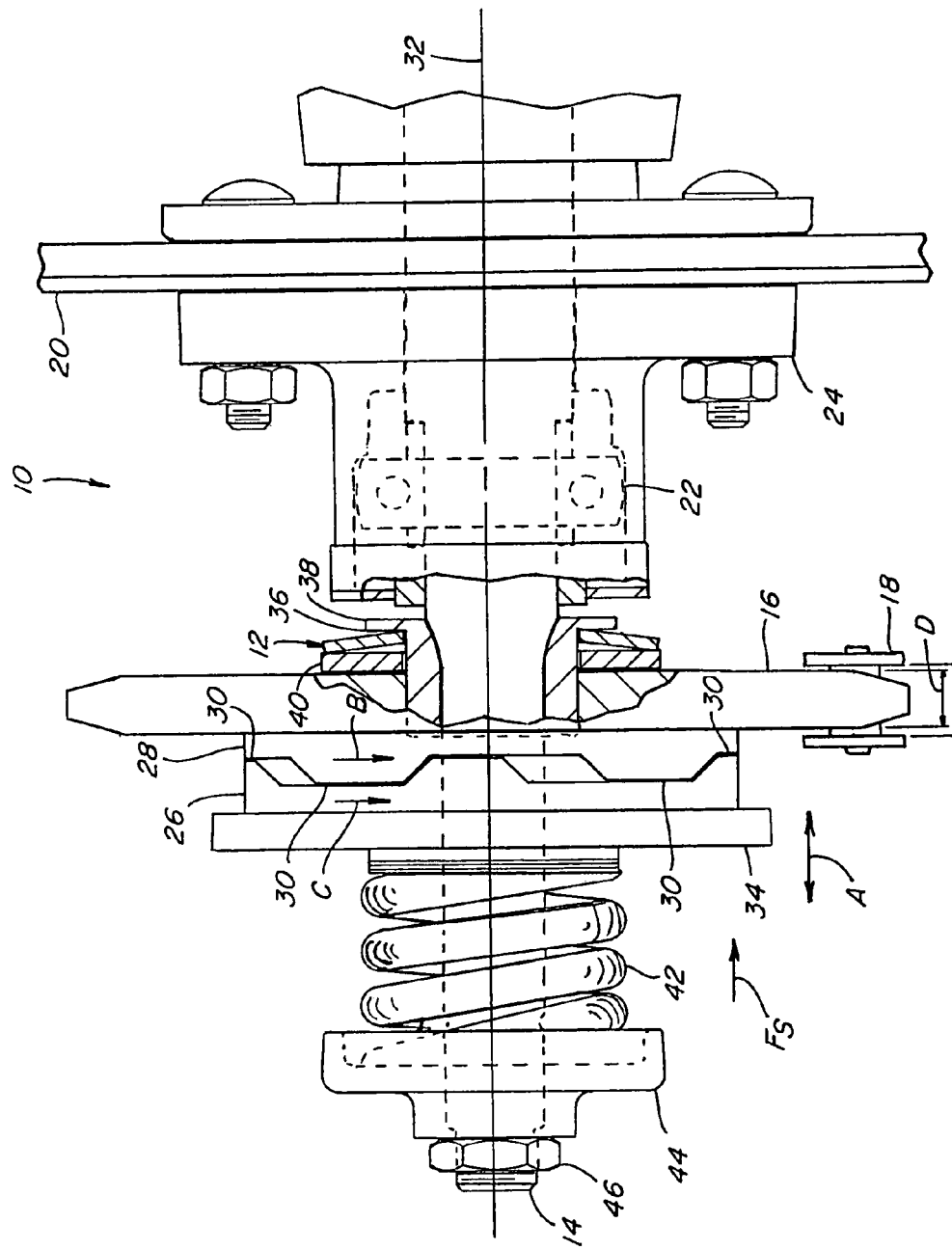
FIG. 1a is another side view of the jaw clutch, in partial cross-section.

Referring now to the drawings, wherein like numbers refer to like parts, FIGS. 1 and 1a show a jaw clutch 10 including a shock damper 12 constructed and operable according to the present invention in a system in cooperation with the other components of the clutch for damping and dissipating axial force loads resulting from rapid engagement of clutch 10 and ratcheting action thereof under overrunning conditions. Jaw clutch 10 is of a common commercially available type for transmitting power between two rotatable members, here including an elongate rotatable shaft 14 and a rotatable sprocket 16, although it should be understood that it is contemplated that the present invention has utility for use with a wide variety of other rotatable members, including, but not limited to, pulleys or sheaves, other shafts, rollers, and the like. Here, sprocket 16 is partially encircled and rotated by a roller drive chain, represented by a conventional chain link 18, rotated by a motor, engine, or other drive means (not shown), in the conventional well known manner. Jaw clutch 10 is mounted on shaft 14 and is automatically operable under normal conditions for connecting shaft 14 in rotatably driven relation to sprocket 16. Shaft 14 can be rotated for performing any useful function, such as, but not limited to, rotating components within a feeder house 20 of an agricultural combine, such as drive sprockets (not shown) of a feeder chain arrangement (also not shown). In this regard, shaft 14 is supported in a well known manner on feeder house 20 by a plurality of bearings, represented by bearing 22 seated in a bearing housing 24 bolted or otherwise suitably mounted on a side of feeder house 20 as shown. Feeder house 20 is representative of feeder houses used for conveying harvested crop from a header of an agricultural combine to threshing apparatus thereof, and typically includes several endless parallel chains spanned by slats which push or convey the crop material upwardly along a bottom surface of the feeder house into an inlet region of the threshing apparatus. From time to time, wads of crop material, brush, weeds, and other items, may be conveyed through the feeder house so as to slow or stall rotation of shaft 14. To avoid slowing or stalling rotation of the drive chain or other components, as a result, and to avoid possible damaging torsional stress on shaft 14 and other components, clutch 12 is automatically disengageable to allow rotation of sprocket 16 relative to shaft 14 until the slowdown or stall condition is remedied or alleviated.

To achieve the above capability, clutch 10 includes a pair of clutch plates, including a first clutch plate 26 and a second clutch plate 28. Clutch plates 26 and 28 are disk shape members each having four axially extending teeth 30 at equally angularly spaced locations around a rotational axis 32. Clutch plates 26 and 28 are mirror images of each other and are disposed such that teeth 30 thereof are axially opposing. Opposing teeth 30 are matingly engageable as shown for joint rotation of clutch plates 26 and 28 about a rotational axis 32 therethrough, opposing teeth 30 being disengageable to allow relative rotation of clutch plates 26 and 28 in the well known manner. First clutch plate 26 is supported about shaft 14 for rotation therewith and movement along an axial path, denoted by arrow A, on a support 34 having an internally splined hole therethrough which receives and is axially movable along an externally splined portion of shaft 14 in the well known manner. Second clutch plate 28 is supported for joint rotation with sprocket 16 about axis 32 relative to shaft 14, on a suitable rotatable member which is preferably a bushing 36 rotatable about shaft 14 at a fixed axial position therealong. The axial position of bushing 36 can be fixed in any suitable conventional manner, such as by abutment with a shoulder around shaft 14. Bushing 36 includes an annular shoulder 38 therearound at an axially fixed location, and a backing washer 40 which axially abuts sprocket 16 opposite second clutch plate 28.

Shock damper 12 of the present invention is preferably an annular disk spring which extends around bushing 36 between shoulder 38 and backing washer 40. Under normal operating conditions, shock damper 12 serves as a substantially rigid member or spacer which, when opposing teeth 30 of clutch plates 26 and 28 are matingly engaged for joint rotation, holds sprocket 16 and clutch plate 28 at a substantially stationary axial position on shaft 14, as shown. On the opposite side of first clutch plate 26, a resiliently yieldable clutch spring 42 is disposed about shaft 14 between support 34 and a spring retainer 44. Retainer 44 is held in position on shaft 14 by a nut 46 threadedly engaged with shaft 14 and tightenable for compressing clutch spring 42 to a desired extent for exerting a spring force, denoted by arrow FS, against support 34. Clutch spring 42 will have a spring rate sufficient to exert a spring force FS of sufficient magnitude to urge first clutch plate 26 against second clutch plate 28, for holding opposing teeth 30 in mating engagement for the joint rotation of clutch plates 26 and 28, denoted by arrows B and C, such that shaft 14 connected to clutch plate 26 will be drivingly rotated by sprocket 16 connected to clutch plate 28, under anticipated normal load conditions. However, clutch spring 42 should allow clutch plate 26 to move away from clutch plate 28 to allow ratcheting movement of opposing teeth 30 when a disengagement force of a desired magnitude denoted by arrow FD (FIG. 3) in opposition to spring fore FS, is exerted against the clutch plates, for instance, as a result of a high torque condition resulting from opposition to rotation of clutch plate 26 such as due to the conditions described above, namely, the presence of wads of crop material, weeds, and other items in the feeder house, or other conditions, that would slow or stall rotation of shaft 14 and/or potentially damage the rotating components or cause other damage.

Thus, shock damper 12 of the present invention should be sufficiently rigid so as to be capable of holding sprocket 16 and clutch plate 28 substantially stationary in the axial direction when anticipated routine spring forces FS and disengagement forces FD are exerted thereagainst. Additionally, and importantly, shock damper 12 should be resiliently yieldable under substantially higher loads, so as to be capable of absorbing at least a substantial amount of axial shock forces exerted against clutch plate 28 as a result of mating reengagement of the teeth of the clutch plates during rapid ratcheting movement thereof, and function as part of a system in cooperation with other components of clutch 10 to dissipate the energy of the shock forces over a limited or predictable time, while still holding clutch plate 28 and sprocket 16 substantially axially stationary, which for the purposes of the present invention includes allowing only very limited axial movement thereof, such that operation thereof is not impaired, and the potential for shock caused damage to components carried on shaft 14, including sprocket 16, the chain, bearing 22, and the chains in feeder house 20, is significantly reduced, compared to if the resultant shock forces are not significantly damped. Such axial shock forces for the present application for driving the chain drive of feeder house 20 have been measured to have a value of as much as 10,000 pounds. By limited axial movement, what is meant is an amount of axial movement sufficiently small such that impairment of the operation of, and damage to, the rotatable members will not occur as a result of the movement. Here, this would mean an amount that would include as a minimum the side play of the chain drive, which would be generally be the difference between the maximum axial width D of the portion of the teeth of sprocket 16 which engage the chain, and the inner axial width E between the side bars of the narrower ones of links 18. This value would be likely increased as a function of the distance between sprocket 16 and the next closest other sprocket engaged with the chain, the longer the distance the greater the value. Thus, for the present application the shock damper 12 should have the ability to dampen the 10,000 pound shock force and dissipate the energy thereof over a time interval or period less than that before the occurrence of the next shock force as a result of ratcheting over another tooth. Because clutch plates 26 and 28 each have 4 teeth at equally spaced locations therearound, the time period between the occurrence of the shock forces will be equal to that for the clutch plates to relatively rotate about ¼ revolution, which for the normal operating speed of the present feeder drive application can be just a few hundredths of a second, for instance, about 0.02 second.

Figure 2:
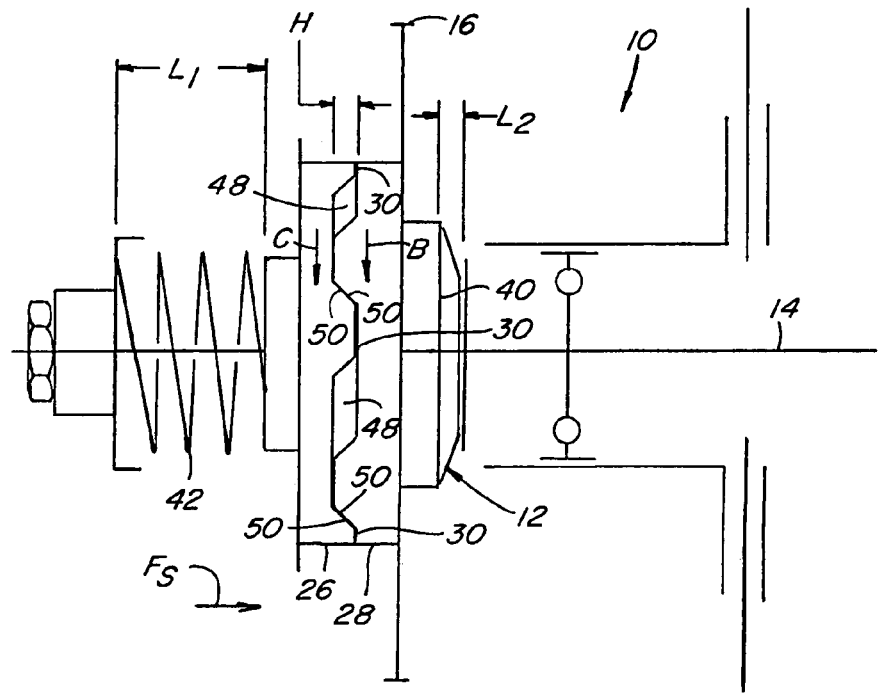
FIG. 2 is a simplified schematic representation of the jaw clutch of FIG. 1, showing opposing teeth of clutch plates of the clutch fully matingly engaged, a clutch spring of the clutch in an initial or normal state for holding the clutch plates together and a shock damper of the invention in a normal state.

FIG. 2 is a simplified schematic representation of jaw clutch 10 for the present application, showing a disk spring shock force damper 12, shaft 14, sprocket 16 and clutch spring 42 which is a single compression coil spring. Clutch spring 42 is shown at its normal or initial axial length L1. Shock force damper 12 is shown at its normal or initial axial length L2. Under normal or engaged conditions, clutch plates 26 and 28 are fully engaged by the exertion of spring force FS against support 34 with shock force damper 12 disposed in contact with backing washer 40 supporting sprocket 16 and second clutch plate 28, for rotation of clutch plate 26 by clutch plate 28, as denoted by arrows B and C. The axial height of opposing teeth 30 is also shown, as denoted by dimension H. Here, H will have a value of about 0.25 inch. It should be noted that adjacent ones of matingly engaged sets of teeth of clutch plates 26 and 28 are separated by spaces 48. Each set of the matingly engaged teeth 30 have opposing ramp surfaces 50 in abutting relation and through which the rotational driving force is transferred from the driving clutch plate, here clutch plate 28, to the driven clutch plate, here clutch plate 26. Surfaces 50 are each preferably oriented at about a 50 to 60 degree angle to the direction of rotation denoted by arrows B and C, although it should be understood that other angles for ramp surfaces 50, including perpendicular to the rotational direction, and other height values H for teeth 30, can be used, as required or desired for a particular application.

Figure 3:
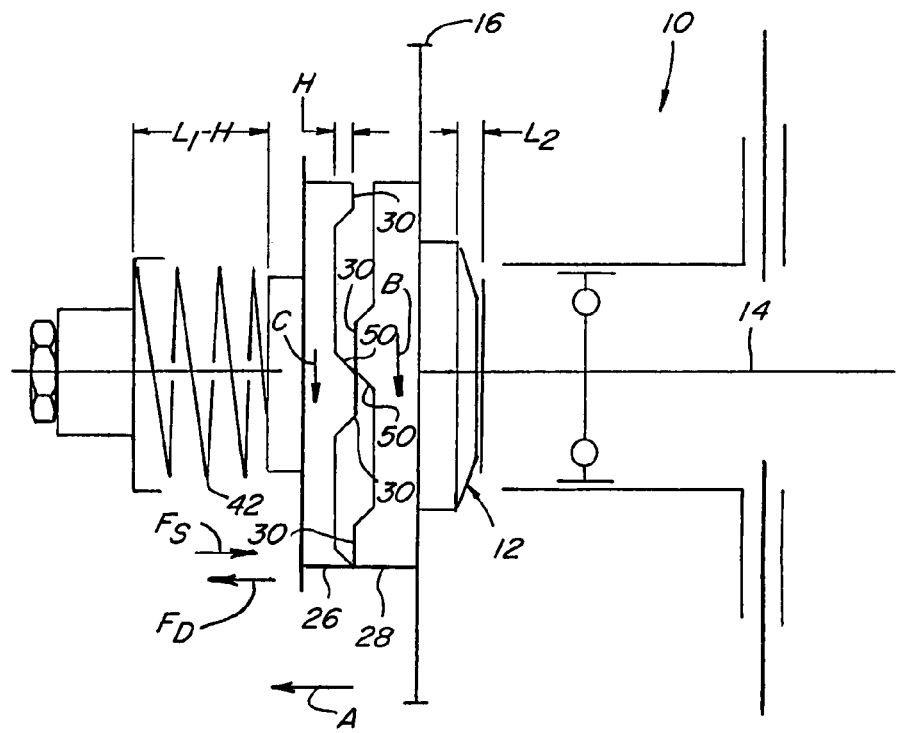
FIG. 3 is another simplified schematic representation of the clutch of FIG. 1, showing the clutch plates urged axially apart by a disengagement force applied between the opposing teeth thereof, the clutch spring compressed from the initial state thereof, and the shock damper in its normal state.

Referring also to FIG. 3, as discussed above, it is contemplated that from time to time there will be instances, such as due to resistance to rotation of the driven one of the rotatable members, when it will be desirable for the driving one of the rotatable members, here sprocket 16, to be allowed to rotate relative to the driven member, here shaft 14, such that potentially damaging loads and stresses are not placed on the power transmission components, and such that the other rotating members connected to the driving rotatable member are not significantly slowed down. This is accomplished by allowing the rotatably driving clutch plate, here clutch plate 28, to rotate in ratcheting relation to the driven clutch plate, here clutch plate 26. This will occur when a disengagement force denoted by arrow FD is generated between clutch plates 26 and 28 in opposition to, and greater in magnitude than, spring force FS exerted by clutch spring 42, such that the clutch plates can be forced the distance H apart. Because shock damper 12 is sufficiently rigid so as to at least substantially retain its initial or original shape under spring force FS and disengagement force FD, length L2 thereof will remain substantially constant or be decreased by only a small amount. As a result, clutch spring 42 will yield to the disengagement force FD such that clutch plate 26 will be axially displaced from clutch plate 28, denoted by arrow A, by an amount at least substantially equal to the height H. Thus, the displacement of clutch spring 42 will be equal to about L1–H. As disengagement force FD overcomes spring force FS, ramp surfaces 50 of the matingly engaged teeth 30 will slide one relative to the other until axially opposing surfaces 52 of teeth 30 engage and hold the clutch plates 26 and 28 apart, as shown in FIG. 4.

Figure 4:
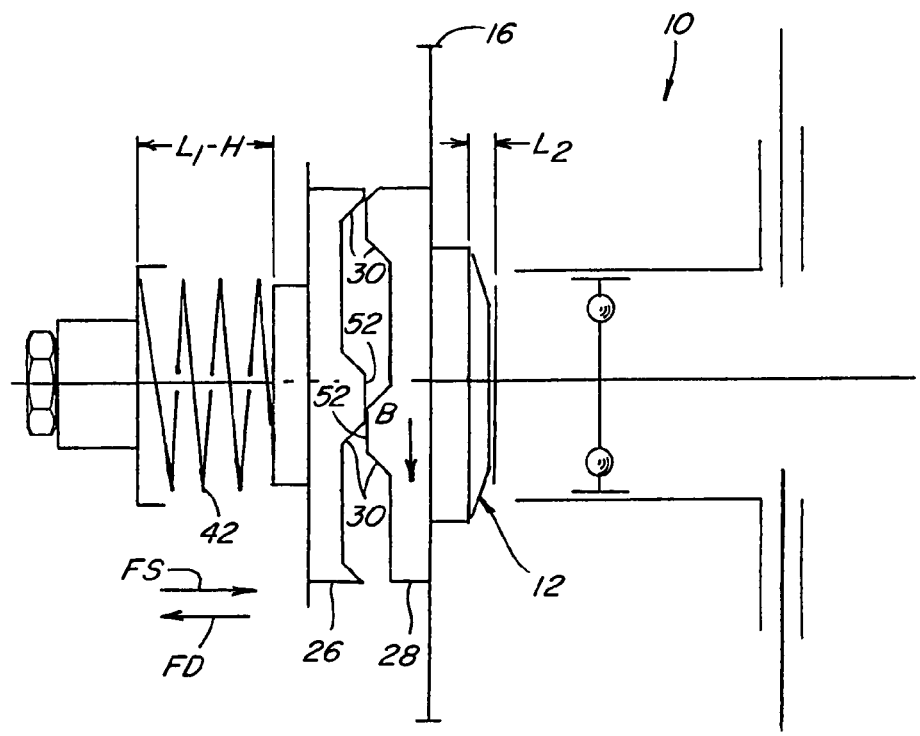
FIG. 4 is another simplified schematic representation of the clutch of FIG. 1, showing the teeth of the clutch plates matingly disengaged to illustrate ratcheting movement of one relative to the other, the clutch spring in a more compressed state, and the shock damper in its normal state.

Referring more particularly to FIG. 4, clutch 10 is shown with clutch plates 26 and 28 held apart by sliding engagement of axially opposing surfaces 52 of teeth 30 as clutch plate 28 and sprocket 16 rotate or ratchet jointly relative to clutch plate 26, as denoted by arrow B. Clutch spring 42 is still displaced by the amount H and damper 12 is still at its initial length L2. Opposing forces FS and FD are still present, the energy thereof being stored as potential energy in spring 42.

Figure 5:
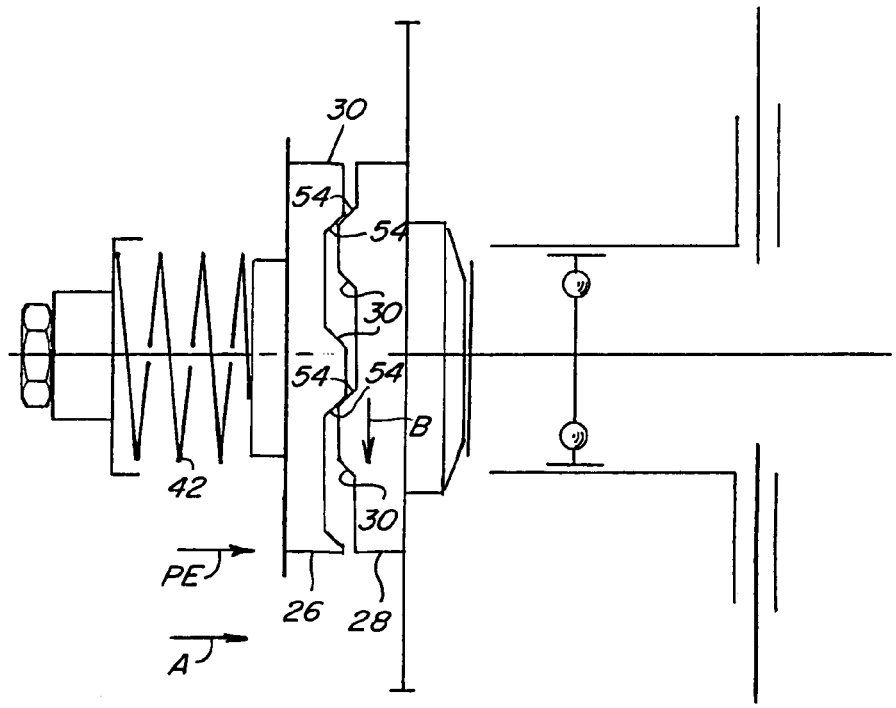
FIG. 5 is still another simplified schematic representation of the clutch of FIG. 1, showing the teeth of the clutch plates partially matingly re-engaged during the ratcheting, the clutch spring in a less compressed state, and the shock damper in its normal state.

In FIG. 5, teeth 30 of clutch plate 28 are shown rotated past teeth 30 of clutch plate 26 such that the clutch plates are no longer held apart thereby. At this position, because teeth 30 of clutch plate 28 are rotating in the direction B relative to teeth 30 of clutch plate 26, even if back surfaces 54 of opposing teeth 30 are briefly engaged, little or none of disengagement force FD will be exerted therebetween to force the clutch plates apart. Instead, the stored potential energy of spring 42 is suddenly released, as denoted by arrow PE, to drive clutch plate 26 rapidly toward clutch plate 28, as denoted by arrow A.

Figure 6:
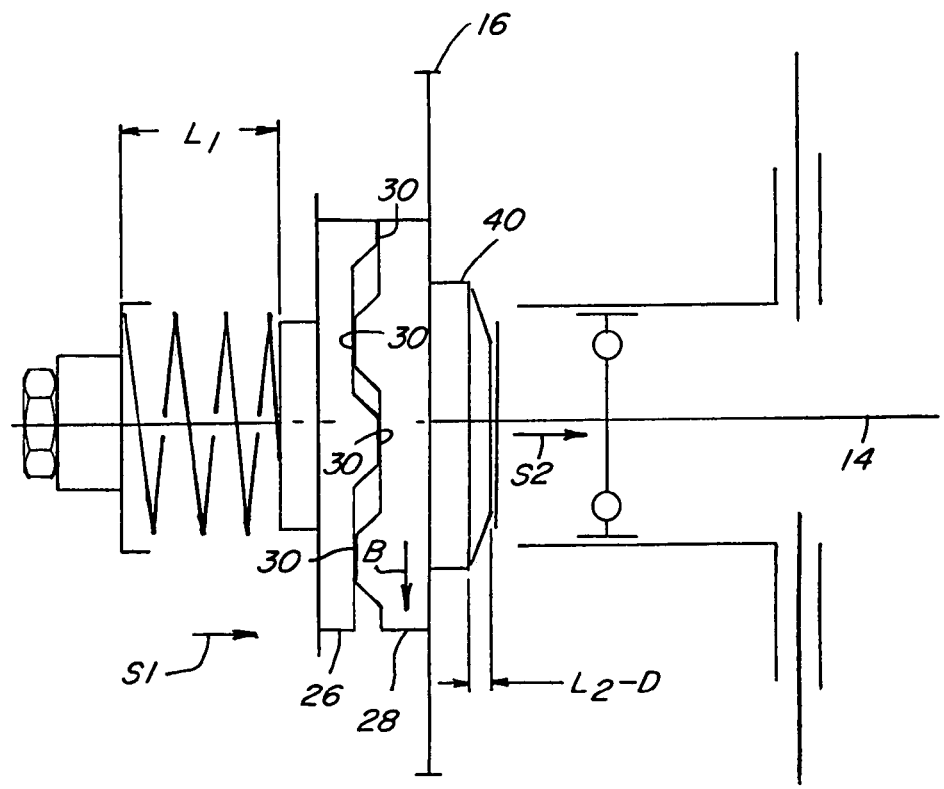
FIG. 6 is still another simplified schematic representation of the clutch of FIG. 1, showing the opposing teeth more fully matingly engaged during the ratcheting movement as a result of release of stored energy by the clutch spring, the clutch spring again in its normal state, and the shock damper in a partially compressed state for absorbing the energy.

Referring also to FIG. 6, the release of the potential energy PE to drive clutch plate 26 toward clutch plate 28 will result in impact between teeth 30 of the clutch plates with a resulting shock force, denoted by arrow S1, having a magnitude several times greater than that of both the spring force FS and the disengagement force FD. When this impact occurs, clutch spring 42 will return to its initial length L1, and the released energy will be transferred through clutch plate 28 and backing washer 40 to shock damper 12 which will absorb at least a substantial portion of the energy, while transferring some to shaft 14 as axial shock load S2. Absorption of the energy will cause shock damper 12 to be displaced or compressed in the axial direction by an amount D, so as to have a resultant axial length equal to L2–D. Because shock damper 12 is a disk spring, when it absorbs the energy and is resultantly deformed, some of the deformation will be in the diameter and shape thereof in addition to in the length thereof, such that axial displacement D and thus axial movement of clutch plate 28 and sprocket 16 can be minimized. Shock damper 12 will then release the absorbed energy such that the energy will be at least partially dissipated by cooperative movements of clutch spring 42 and clutch plates 26 and 28, and, as a result the magnitude of shock forces or loads S2 transferred to shaft 14 will be damped and much lower than the magnitude of the initial shock force S1. Thus shock force damper 12 and clutch spring 42 should be selected so as to provide a desired torque transferring capability required for a particular application while maintaining sprocket 16 at a substantially stationary axial position on shaft 14, and such that shock damper 12 will absorb a useful amount of the energy of anticipated shock forces, and further such that shock force damper 12, clutch plates 26 and 28, and clutch spring 42 will cooperate to dissipate a substantial portion of the shock force energy to substantially lower the magnitude of resultant shock forces or loads S2 transferred to shaft 14.

As a preferred combination adapted for the present application, the spring rate of the disk spring should be at least ten times greater than the spring rate of the clutch spring. More preferably, the spring rate of the disk spring is at least fifteen times greater than the spring rate of the clutch spring. A range of suitable values for the spring rate of the disk spring can be between about 30,000 and about 40,000 pounds per inch and the spring rate of the clutch spring between about 2,000 and about 3,000 pounds per inch. More preferably, the spring rate of the disk spring is between about 35,000 and 38,000 pounds per square inch and the spring rate of the clutch spring is between about 2,100 and 2,400 pounds per square inch. More specifically, a satisfactory spring rate of the disk spring is about 36,800 pounds per inch and the spring rate for the clutch spring about 2,235 pounds per inch. However, it should be recognized that other spring rates may be more suitable for other applications, it being most important to recognize that the spring rate for the shock damper should be sufficiently greater than that of the clutch spring such that resultant shock forces exerted on the rotatable members will be damped but significant movement of the second clutch plate will not be permitted.

Turning to FIG. 7, a graphical representation of resultant shock force measured on shaft 14 versus time for ratcheting operation of jaw clutch 10 without shock force damper 12. Positive force measurements reflect forces exerted in the direction to compress clutch spring 42 and negative force values reflect shock forces resulting from release of stored energy. Thus, peak 56 reflects axial force on shaft 14 as disengagement force FD is applied for matingly disengaging the teeth of clutch plates 26 and 28, and negative peak 58 reflects the initial axial shock force exerted against shaft 14 when the teeth are abruptly matingly re-engaged. The magnitude of the disengagement force represented by peak 56 is about 2,000 pounds. The magnitude of the shock force is about 10,000 pounds. Subsequent forces resulting from the re-engagement have magnitudes of more than 6,000 pounds. This pattern is repeated at about 0.02 second intervals.

FIG. 8 shows resultant axial shock forces exerted against shaft 14 with shock force damper 12 installed on jaw clutch 10 as described above. Here, the axial force exerted against shaft 14 by the disengagement force FD still has a maximum value as denoted at peak 56 of about 2,000 pounds. However, the maximum shock force exerted against shaft 14 is less than 4,000 pounds, as denoted by peak 16. This is also true of the subsequent ratcheting actions at about the same time intervals as shown in FIG. 7 throughout a span of about 0.10 second. Thus, it is apparent that resultant axial shock forces exerted against shaft 14 are reduced by at least half, and by as much as 60% or more. As a result of the substantially decreased axial shock forces exerted against shaft 14, occurrence of resultant damage to components thereof is correspondingly reduced.

Figure 9:
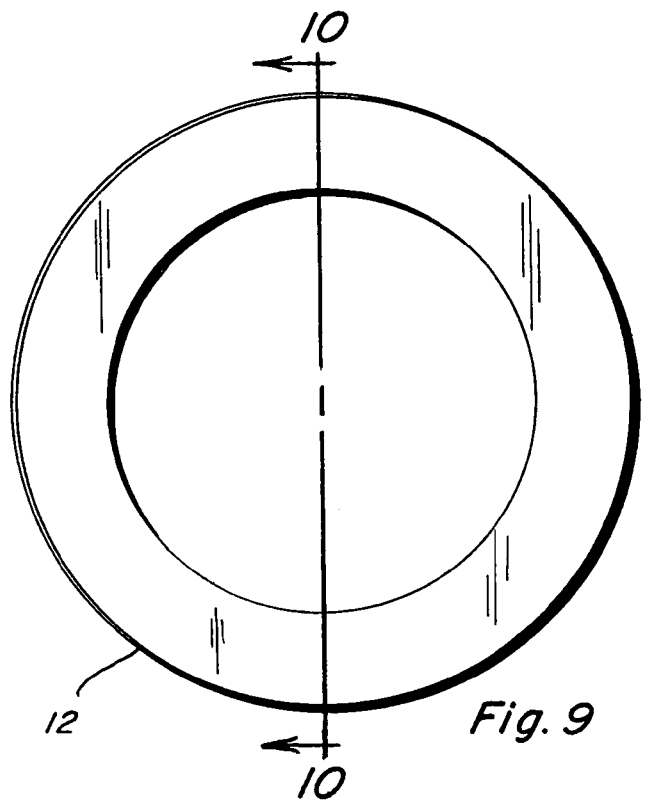
FIG. 9 is an end view of the shock damper of FIG. 1.
Figure 10:
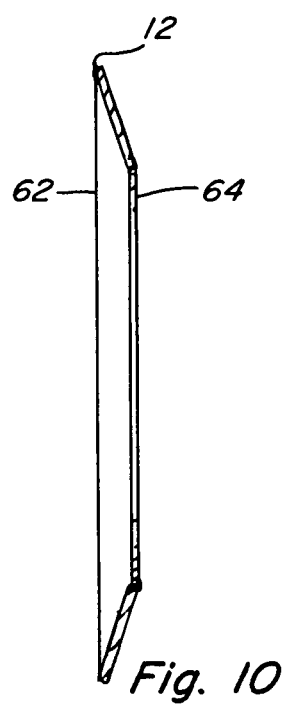
FIG. 10 is a sectional view of the shock damper.

FIGS. 9 and 10 are an end view and a sectional view of shock force damper 12. As noted above, shock force damper 12 is an annular disk spring having a frusto-conical shape, including a larger diameter end 62 which is positioned to abut and bear against backing washer 40, and an opposite smaller diameter end 64 that is positioned in abutment with shoulder 38 of bushing 36, both as shown in FIG. 1. As also noted above, the disk spring of shock force damper 12 will have a spring rate at least several times greater than that of clutch spring 44, to provide the shock force damping capability as graphically illustrated in FIG. 8. When shock force damper 12 absorbs shock forces such as due to the release of potential energy PE, the disk spring resiliently flattens in the axial direction and deforms in shape, the disk spring having memory properties so as to return to its original shape after removal or reduction of the force.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a jaw clutch for transferring rotational power from a driving rotatable member to a driven rotatable member, the jaw clutch including a first clutch plate connected to one of the rotatable members for rotation therewith and movement along a predetermined path relative thereto, and a second clutch plate connected to another of the rotatable members for rotation therewith adjacent to an end of the path, the clutch plates including teeth matingly engageable when the clutch plates are in abutment for connecting the clutch plates for joint rotation, and a clutch spring having a predetermined spring rate disposed for exerting a spring force against the first clutch plate for holding the first clutch plate at the end of the path in abutment with the second clutch plate, the clutch spring being yieldable to a disengagement force greater than the spring force applied against the first clutch plate in opposition to the spring force such that the first clutch plate will be moved along the path away from the second clutch plate and the teeth of the clutch plate connected to the drivingly rotated member will move in a ratcheting action over the teeth of the clutch plate connected to the driven rotating member to generate shock forces between the clutch plates having magnitudes substantially greater than the magnitude of the disengagement force at time intervals which are a function of a relative speed of rotation of the clutch plates, an improvement comprising:

a shock damper including a spring having a predetermined spring rate several times greater than the spring rate of the clutch spring disposed in connection with the second clutch plate in a position for absorbing a substantial portion of energy of the shock forces generated between the clutch plates and then releasing the energy so as to be at least partially dissipated by the clutch such that resulting portions of shock forces exerted against the rotating members will be damped so as to have maximum magnitudes equal to less than half of the magnitudes of the shock forces generated between the clutch plates, while holding the second clutch plate substantially stationary adjacent to the end of the path.

2. In the jaw clutch of claim 1, the spring of the shock damper comprising a disk spring which is resiliently deformable from an initial shape to a deformed shape by absorbing the energy of the shock forces, and which will return to the initial shape by releasing the energy absorbed thereby.

3. In the jaw clutch of claim 2, the improvement further comprising the disk spring being operable in cooperation with the clutch spring for cyclically transferring at least a portion of the energy of the shock force between the clutch plates for dissipating the energy.

4. In the jaw clutch of claim 1, the improvement comprising the spring rate of the disk spring being at least ten times greater than the spring rate of the clutch spring.

5. In the jaw clutch of claim 1, the improvement comprising the spring rate of the disk spring being at lest fifteen times greater than the spring rate of the clutch spring.

6. In the jaw clutch of claim 1, the improvement comprising the spring rate of the disk spring being between about 30,000 and about 40,000 pounds per inch and the spring rate of the clutch spring being between about 2000 and about 3000 pounds per inch.

7. In the jaw clutch of claim 1, the improvement comprising the spring rate of the disk spring being between about 35,000 and about 38,000 pounds per inch and the spring rate of the clutch spring being between about 2100 and about 2400 pounds per inch.

8. In the jaw clutch of claim 2, the second clutch plate and the rotatable member connected thereto being mounted on a sleeve supported on the rotatable member connected thereto in fixed relation to the end of the path, the sleeve including a shoulder extending therearound, and the improvement further comprising the disk spring being disposed between the rotatable member connected to the second clutch plate and the shoulder.

9. In a jaw clutch engageable for connecting a rotatable shaft and a rotatable member supported thereon for joint rotation about an axis of the shaft, the clutch being disengageable for allowing relative rotation of the shaft and the member, the clutch including a first clutch plate mounted on the shaft for rotation therewith and axial movement therealong, a second clutch plate mounted on the shaft and connected to the member for rotation relative to the shaft, the clutch plates having axially opposing teeth matingly engageable for joint rotation thereof, and a clutch spring disposed for applying an axial spring force against the first clutch plate for holding the opposing teeth in mating engagement, the clutch plates being movable apart by application of a disengagement force between the teeth such that the opposing teeth will rotate in ratcheting relation so as to alternatingly disengage and fully or partially matingly re-engage to exert axial shock forces against the clutch plates having magnitudes several times greater than magnitudes of the spring force and the disengagement force, an improvement comprising:

a damper spring disposed between the second clutch plate and an element mounted at an axially fixed location on the shaft, the damper spring having a spring rate at least several times greater than a spring rate of the clutch spring so as to hold the second clutch plate in a substantially stationary axial position when only the spring force and the disengagement force are applied, and so as to absorb at least a substantial portion of energy of the shock forces exerted against the clutch plates and dissipate energy thereof in cooperation with the clutch spring and the clutch plates such that resultant axial shock forces exerted against the shaft will have maximum magnitudes of less than half the magnitudes of the shock forces exerted against the clutch plates.

10. In the jaw clutch of claim 9, the improvement comprising the spring rate of the damper spring being at least ten times greater than the spring rate of the clutch spring.

11. In the jaw clutch of claim 9, the improvement comprising the spring rate of the damper spring being at least fifteen times greater than the spring rate of the clutch spring.

12. In the jaw clutch of claim 9, the improvement comprising the spring rate of the damper spring being between about 30,000 and about 40,000 pounds per inch and the spring rate of the clutch spring being between about 2000 and about 3000 pounds per inch.

13. In the jaw clutch of claim 12, the spring rate of the damper spring being between about 35,000 and about 38,000 pounds per inch and the spring rate of the clutch spring being between about 2100 and about 2400 pounds per inch.

14. In the jaw clutch of claim 9, the damper spring comprising a disk spring.

15. In a jaw clutch mounted on a shaft rotatable about an axis therethrough, the clutch including a first clutch plate mounted on the shaft for rotation therewith and axial movement therealong, a second clutch plate mounted on a sleeve around the shaft and connected to a rotatable member for rotation about the shaft, the sleeve having a shoulder therearound at a predetermined axial location, the clutch plates having axially opposing teeth matingly engageable for connecting the shaft and the member for driven rotation of one by the other, and a clutch spring disposed for applying an axial spring force against the first clutch plate for holding the opposing teeth in mating engagement, the clutch plates being movable axially apart by application of a disengagement force between the teeth resulting from resistance to rotation of the driven one of the shaft and the member such that the opposing teeth will rotate in ratcheting relation wherein the teeth cyclically disengage and fully or partially matingly re-engage so as to exert axial shock forces against the clutch plates having magnitudes several times greater than magnitudes of the spring force and the disengagement force, respectively, an improvement comprising:

a resilient shock damper including a disk spring disposed between the second clutch plate and the shoulder, the disk spring having a spring rate sufficiently greater than a spring rate of the clutch spring so as to hold the second clutch plate substantially axially stationary when only the spring force and the disengagement force are applied, and so as to absorb energy of the shock forces exerted against the second clutch plate and release and redirect the energy through the clutch plates to the clutch spring so as to be at least partially dissipated such that any resulting shock forces exerted against the shaft will have magnitudes substantially less than magnitudes of the shock forces exerted against the clutch plates.

16. In the jaw clutch of claim 15, the damper wherein the disk spring is resiliently deformable from an initial shape to a deformed shape by absorbing the energy of the shock forces and which will return to the initial shape by releasing the energy absorbed thereby.

17. In the jaw clutch of claim 16, the improvement further comprising the disk spring being operable in cooperation with the clutch spring for cyclically transferring at least a portion of the energy of the shock forces to the clutch plates for dissipation by relative movement thereof.

18. In the jaw clutch of claim 15, the improvement comprising the spring rate of the disk spring being at least ten times greater than the spring rate of the clutch spring.

19. In the jaw clutch of claim 15, the improvement comprising the spring rate of the disk spring being at least fifteen times greater than the spring rate of the clutch spring.

20. In the jaw clutch of claim 15, the improvement comprising the spring rate of the disk spring being between about 30,000 and about 40,000 pounds per inch and the spring rate of the clutch spring being between about 2000 and 3000 pounds per inch.

21. In the jaw clutch of claim 15, the spring rate of the disk spring being between about 35,000 and about 38,000 pounds per inch and the spring rate of the clutch spring being between about 2100 and about 2400 pounds per inch.

* * * * *